United States Patent [19]

Glennon

[11] 4,243,500

[45] Jan. 6, 1981

[54] PRESSURE SENSITIVE ADHESIVES

[75] Inventor: Alfred E. Glennon, Anaheim, Calif.

[73] Assignee: International Coatings, Co., Inc., Compton, Calif.

[21] Appl. No.: 965,800

[22] Filed: Dec. 4, 1978

Related U.S. Application Data

[63] Continuation-in-part of Ser. No. 873,869, Jan. 31, 1978, abandoned.

[51] Int. Cl.$^3$ ............... C08F 2/50; C08L 53/02
[52] U.S. Cl. ............... 204/159.12; 156/331; 156/334; 204/159.15; 204/159.17; 260/27 BB; 525/93; 525/98
[58] Field of Search ............... 204/159.12, 159.15, 204/159.17; 260/27 BB

[56] References Cited

U.S. PATENT DOCUMENTS

| | | | |
|---|---|---|---|
| 3,328,194 | 6/1967 | Kasper | 204/159.12 X |
| 3,681,190 | 8/1972 | Dahlquist | 204/59 C |
| 3,743,616 | 7/1973 | Kest | 260/27 BB |
| 3,790,533 | 2/1974 | Samour | 260/78.5 R |
| 3,865,770 | 2/1975 | Blake | 260/27 R |
| 3,897,295 | 7/1975 | Dowbenko et al. | 156/272 |
| 3,912,676 | 10/1975 | Brizzolara et al. | 260/27 BB |
| 3,929,938 | 12/1975 | White et al. | 156/332 X |
| 3,996,394 | 12/1976 | Harris | 204/159.15 X |
| 4,058,443 | 11/1977 | Murata et al. | 204/159.17 |

OTHER PUBLICATIONS

"Kraton Thermoplastic Rubber Crumb", Shell Chemical Company, Polymers Division, Aug. 1972.
"Thermoplastic Rubber Kraton", Kraton 1000 Polymers for Adhesives, Sealants and Coatings, Shell Chemical Company, Polymers Division, Jun. 1970.
"Kraton and Kraton G Thermoplastic Rubber", Shell Chemical Company, Jan. 1976.
Stueben, *Adhesives Age*, Jun. 1977, pp. 16–21.

*Primary Examiner*—Walter C. Danison
*Attorney, Agent, or Firm*—William P. Green

[57] ABSTRACT

A pressure sensitive adhesive is formed from a composition comprising mono-functional unsaturated acrylate ester monomer, essentially saturated tackifying resin polymer dissolved in the acrylate ester, non-crystallizing elastomeric material also dissolved in the acrylate ester, and an initiator responsive to ultraviolet light or other penetrating radiation such as electron beam, gamma or X-ray radiation. The composition is cured by subjection to ultraviolet light or other radiation, which causes the initiator to induce polymerization of both the acrylate ester and the non-crystallizing elastomeric material, apparently with co-polymerization therebetween.

41 Claims, No Drawings

PRESSURE SENSITIVE ADHESIVES

This application is a continuation-in-part of my co-pending application Ser. No. 873,869 filed Jan. 31, 1978, now abandoned, on "Pressure Sensitive Adhesive".

BACKGROUND OF THE INVENTION

This invention relates to improved pressure sensitive adhesives, and to compositions and processes for forming such adhesives.

The most common methods of producing pressure sensitive adhesives utilize compositions in which natural or synthetic rubber and a tackifying resin are dissolved in a highly volatile solvent, with the solvent ultimately being evaporated from the composition to leave the dissolved substances in place on a substrate. Such a process has the disadvantage of requiring high thermal energy input for evaporating the solvent, and introducing air pollution and fire hazard problems as a result of emission of and the necessity to control the solvent vapors. In some instances, acrylic resin emulsions have been utilized in lieu of the solvent solutions, with resultant elimination of the fire hazard, but without overcoming the high thermal energy input requirements because of a necessity for evaporating water from the emulsions. Other processes employed in making pressure sensitive adhesives have utilized hot melt compositions, but here again a great deal of energy is required for heating the melt.

More recently, development work has been done with ultraviolet polymerization systems, employing compositions which are liquid at room temperature and are essentially solvent free, and will polymerize to a permanently tacky pressure sensitive film upon exposure to ultraviolet light. Other processes have employed different types of radiation, such as for example electron beam radiation for causing polymerization of the pressure sensitive film. One patent stressing electron beam curing is U.S. Pat. No. 3,897,295, in which the composition subjected to the electron beam includes an acrylate monomer selected from a particular specified group, and a homo polymer or co-polymer of a substance or substances selected from the same group. The polymer is dissolved in the monomer, and the monomer is ultimately polymerized to bind the adhesive film together. This patent states that a thickener such as neoprene may be added to the composition, as may other additives.

In some types of compounds in which acrylate monomers have been employed, such as for example in printing inks and the like, there have been intermixed with the acrylates a photo-initiator material which is adapted to respond to ultraviolet radiation in a manner inducing polymerization of the acrylate to a hardened and cured form.

SUMMARY OF THE INVENTION

The present invention provides unique pressure sensitive adhesives which can be made without the necessity for high thermal input, and without emission of volatile solvent vapors into the atmosphere, and in an extremely simple and straight-forward manner resulting in a lower cost of production than with most conventional processes. At the same time, however, the resultant product may have extremely effective adhesive characteristics, and those characteristics can be varied controllably by altering proportions of the different ingredients used in the composition.

To achieve these results, the pressure sensitive adhesive of the present invention is formed from a composition which includes a monofunctional unsaturated acrylate ester monomer, or mixture of such acrylate ester monomers, as a primary solvent of the composition, with there being dissolved in the acrylate a thermoplastic tackifying resin polymer, or mixture of such polymers, and one or more natural or synthetic elastomeric materials of a non-crystallizing type. In conjunction with these substituents, the composition also includes a free radical generating initiator material which can respond to ultraviolet light, and which when subjected to such ultraviolet light will act as a photo-initiator to induce polymerization of both the acrylate ester and the non-crystallizing elastomer. This initiator will also induce polymerization of the ester and elastomer when subjected to other types of radiation, other than ultraviolet, such as electron beam radiation, or gamma or X-ray radiation. It is thought that the polymerization includes co-polymerization or cross linking between the acrylate ester and the elastomer, to produce a film or matrix throughout the ultimate adhesive layer which is extremely effective in maintaining the integrity of the layer and resisting its rupture under load forces, while at the same time allowing flexibility of the cured adhesive in correspondence with flexure of a substrate to which the adhesive layer may be secured.

Since the acrylate ester monomer which initially functions as a solvent is reactive in the composition and ultimately polymerizes to act as a film forming agent or matrix in the final adhesive, the solvent is not emitted as a volatile flammable vapor, and does not produce the adverse effects accompanying use of such volatile solvents. While it is contemplated that a limited amount of volatile solvent may, if desired, be utilized in conjunction with the other ingredients, it is preferred that no such volatile solvent be employed.

DESCRIPTION OF THE PREFERRED EMBODIMENTS

To discuss the individual components of the adhesive forming composition in detail, and with reference first to the acrylate monomer, which functions as a reactive solvent in the composition, it is contemplated broadly that this ingredient of the composition may be any monofunctional unsaturated acrylate ester monomer, or mixture of such monomers, whether aliphatic or cyclic, and if cyclic may be aromatic with a six membered ring or rings, or have other numbers of members in its ring or rings. It is currently thought preferable that the monofunctional acrylate ester be a cyclic acrylate with a five membered ring. The optimum acrylate monomer thus far utilized is tetrahydrofurfuryl acrylate, a cyclic five member monomer sold by Daubert Chemical Co. under the trade designation "Melcril 4079". The structural formula for this presently preferred acrylate is:

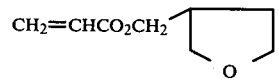

Within the broad category of monofunctional unsaturated acrylate ester monomers, it is in most instances desirable that the acrylate monomer be a substance or mixture of substances selected from the group consisting of ethyl acrylate, 2-ethyl hexyl acrylate, hydroxypropyl acrylate, 2,3 dibromopropyl acrylate, n-propyl acrylate, butyl acrylate, iso-propyl acrylate, n-decyl acrylate, iso-decyl acrylate, nonyl acrylate, iso-nonyl acrylate, benzyl acrylate (e.g. the product sold by Daubert Chemical Co. as "Melcril 4085"), tetrahydrofurfuryl acrylate (e.g. the product sold by Daubert Chemical Co. as "Melcril 4079"), phenylcellosolve acrylate (also known as phenoxyethyl acrylate) (e.g. the product sold by Ware Chemical Co. as "Chemlink 160"), octyl acrylate, iso-octyl acrylate, hydroxyethyl acrylate, ethyleneglycol acrylate phthalate (e.g. the product sold by Daubert Chemical Co. as "Melcril 4083"), butoxyethyl acrylate, ethoxyethyl acrylate, cyclohexyl acrylate, lauryl acrylate, and isobornyl acrylate (e.g. "IBOA" of Rohm & Haas Co.).

The second principal ingredient of the composition is the tackifying resin polymer, which may be any appropriately tacky essentially saturated thermoplastic tackifying resin polymer or polymers soluble in the acrylate ester monomer or monomers used therewith. The tackifying resin in its dissolved state is in sub-micron size within and uniformly dispersed throughout the acrylate or acrylates as a solvent. When the acrylate is ultimately polymerized to a continuous film form, the tackifying resinous polymer, still uniformly dispersed throughout the matrix, acts by reason of its molecular weight and tackiness to wet any substrate of higher surface energy than that inherent in the dissolved particles. The resinous polymer is selected to have a glass transition temperature low enough to give the polymer the desired tackiness and wetting characteristics.

Best results are achieved when the tackifying resin is a substance or mixture of substances selected from the group consisting of esters of rosin, hydrogenated esters of rosin, modified rosin esters, esters of polymerized rosin, esters of hydrogenated rosin, hydrocarbon resin, linear homo polymers of alpha-methyl styrene, alpha-pinene terpene hydrocarbon resin, aromatic modified C-5 hydrocarbon resin, vinyltoluene alpha methyl styrene co-polymer resins, beta-pinene terpene resins, polycyclic hydrocarbon resins and technical hydroabietyl alcohol.

Certain specific commercially available materials falling within this general category of preferred tackifying resins are:

methyl esters of rosin, as sold by Hercules, Inc. under the trademark "Abalyn"
hydrogenated methyl esters of rosin, sold by Hercules, Inc. as "Hercolyn"
technical hydroabietyl alcohol, sold by Hercules, Inc. as "Abitol"
modified rosin ester, sold by Hercules, Inc. as "Cellolyn 104"
glycerol ester of pale wood rosin, sold by Hercules, Inc. as "Ester Gum 8L"
diethyleneglycol ester of rosin, sold by Hercules, Inc. as "Flexalyn"
pentaerythritol ester of modified rosin, sold by Hercules, Inc. as "Pentalyn C"
pentaerythritol ester of rosin, sold by Hercules, Inc. as "Pentalyn A"
pentaerythritol ester of highly stabilized rosin, sold by Hercules, Inc. as "Foral 85"
resinous terpene polybasic acid, sold by Hercules, Inc. as "Petrex Acid"
ethylene glycol ester of polymerized rosins, sold by Hercules, Inc. as "Poly-pale Ester 1"
diethyleneglycol ester of polymerized rosin, sold by Hercules, Inc. as "Poly-pale Ester 2"
glycerol ester of polymerized rosin, sold by Hercules, Inc. as "Poly-pale Ester 10"
ethylene glycol ester of hydrogenated rosin, sold by Hercules, Inc. as "Staybelite Ester 1"
diethylene glycol ester of hydrogenated rosin, sold by Hercules, Inc. as "Staybelite Ester 2"
triethylene glycol ester of hydrogenated rosin, sold by Hercules, Inc. as "Staybelite Ester 3"
glycerol ester of hydrogenated rosin, sold by Hercules, Inc. as "Staybelite Ester 5"
mixed ester of hydrogenated rosin, sold by Hercules, Inc. as "Staybelite Ester 101"
aromatic modified C-5 hydrocarbon resin, sold by Exxon Chemical Co. as "Escorez 1511"
linear homopolymer of alpha-methyl styrene, sold by Amoco Chemical Corp. as "Amoco Resin 18"
alpha-pinene terpene hydrocarbon resin, sold by Hercules, Inc. as "Piccolyte A-100"
vinyltoluene-alpha methyl styrene co-polymer resin, sold by Hercules, Inc. as "Piccotex 75"
beta-pinene terpene resin, sold by Hercules, Inc. as "Piccolyte S-100"
polycyclic hydrocarbon resin, sold by Exxon Chemical Co. as "Escorez 5280"

The third primary ingredient of the composition, that is, the elastomer, may broadly be any natural or synthetic elastomer or mixture of elastomers which are soluble in the acrylate ester monomer or monomers of the composition, and which are of a non-crystallizing amorphous character. It is found that elastomers which can crystallize, such as for example polychloroprene (neoprene), are not desirable for use in the present compositions. For best results, it is currently felt preferable that the elastomer employed in my compositions be a substance or mixture of substances selected from the group consisting of the following materials:

thermoplastic polyurethane, such as, for example, "Estane 5716" of B. F. Goodrich Co.
polyvinyl butyral, such as "Butvar 76" of Monsanto Polymers & Petrochemicals Co.
chlorosulfonated polyethylene, such as "Hypalon" of E. I. DuPont de Nemours & Co.
butadiene-acrylonitrile co-polymer, such as "Hycar 1432" of B. F. Goodrich Chemical Co.
radial block styrene-butadiene-styrene co-polymer, such as "Solprene 411" of Phillips Chemical Co.
lineal block styrene-butadiene co-polymer, such as "Solprene 1205" of Phillips Chemical Co.
lineal block styrene-butadiene-styrene co-polymer, such as "Kraton 1102" of Shell Chemical Co.
styrene-isoprene-styrene lineal block co-polymer, such as "Kraton 1107" of Shell Chemical Co.
styrene-ethylene-butylene-styrene lineal block co-polymer, such as "Kraton G" of Shell Chemical Co.
stereo-specific styrene-butadiene co-polymer, such as "Stereon 700" of Firestone Synthetic Rubber & Latex Co.
stereo-specific polybutadiene rubber, such as "Diene 55 NFA" of Firestone Synthetic Rubber & Latex Co.
liquid synthetic polyisoprene, such as "Isolene 40" of Hardman, Inc.
de-polymerized natural rubber, such as "DPR-40" of Hardman, Inc.
carboxy terminated butadiene-acrylonitrile co-polymer, such as "Hycar 1300×8" of B. F. Goodrich Chemical Co.

carboxy terminated butadiene-acrylonitrile co-polymer with random carboxyl groups on the chain, such as "Hycar 1300×9" of B. F. Goodrich Chemical Co.

vinyl terminated butadiene-acrylonitrile co-polymer, such as "Hycar 1300×14" of B. F. Goodrich Chemical Co.

amine terminated butadiene-acrylonitrile co-polymer, such as "Hycar 1300×16" of B. F. Goodrich Chemical Co.

carboxy terminated liquid polybutadiene, such as "Butarez CTL, type I or II" of Phillips Chemical Co.

non-functional liquid polybutadiene, such as "Butarez NF" of Phillips Chemical Co.

hydroxy terminated liquid polybutadiene, such as "Butarez HTS" of Phillips Chemical Co.

polyester resin, such as "Vitel PE-200" of The Goodyear Tire and Rubber Co.

vinyl toluene resin, such as "Pliolite VT" of The Goodyear Tire and Rubber Co.

high vinyl 1,2 polybutadiene, such as "Ricon 150" of Colorado Chemical Specialties, Inc.

high vinyl 1,2 polybutadiene styrene copolymer, such as "Ricon 100" of Colorado Chemical Specialties, Inc.

The fourth principal ingredient of the composition is the free radical emitting initiator, which is a substance adapted to be excited when subjected to penetrating radiation, such as ultraviolet light within a wavelength range of between about 1800 and 4000 Angstroms and desirably between about 3500 and 3600 Angstroms. This initiator is also excitable by other types of penetrating radiation, such as electron beam, gamma or X-ray radiation. When excited by any of these types of radiation, the initiator emits free radicals moving rapidly within the composition and acting to induce polymerization of both the monofunctional acrylate and the elastomer, and, it is thought, to induce co-polymerization or cross-linking of these substances to form an overall continuous matrix of optimum integrity. The free radicals emitted by the initiator strike the acrylate monomer and elastomer molecules and break them apart at their double bonds, to thereby facilitate polymerization and cross-linking through the initially unsaturated points at which those double bonds occurred.

It is also believed that the polymerization and cross-linking of the substances in the composition may be enhanced by the chain scission action of the ultraviolet or other radiation on any ethylenic type chains in the substances, which after scission present sites for the action produced by the free radicals.

Any initiator capable of functioning in this manner may be employed. Desirably, the initiator is a substance or substances selected from the group consisting of all phenones and substituted phenones, preferably benzophenone, diethoxyacetophenone, p-bromoacetophenone, and benzoin ether.

The four ingredients thus far discussed are preferably present in the composition in the following proportions, by weight:

100 parts monofunctional unsaturated acrylate ester monomer
50 to 250 parts tackifying resin polymer
4 to 150 parts non-crystallizing elastomeric material
1 to 6 parts initiator In addition to the four primary constituents, the composition may include also any of various different types of additives for giving to the composition or adhesive desired characteristics, or for preventing degradation thereof, or for any other purpose. For example, it is helpful to introduce into the composition during the initial mixing process an appropriate solvent-free anti-foam agent, such as the product sold by Mallinckrodt Chemical Co. as "BYK-O". The anti-foam agent may be utilized in a proportion of 0.1 to 6 parts by weight of the solvent-free anti-foam agent to 100 parts of the acrylate ester.

The composition may also include a plasticizing oil or grease functioning as a softening agent for the elastomeric component, and acting to enhance the tackiness of the film, as well as functioning as an oxygen shield for the surface of the wet, unpolymerized, adhesive film by a slight degree of blooming to the surface, thereby reducing oxygen inhibition of the polymerization of the acrylate monomer and elastomer. Any of the known oils or greases usable for this purpose may be employed, desirably selected from the group consisting of aromatic process oil (e.g. "Petroflux LV" of Witco Chemical Co.), naphthenic process oil (e.g. "Cyclolube 1114" of Witco Chemical Co.), paraffinic-naphthenic process oil (e.g. "Cyclolube 1413" of Witco Chemical Co. or "Stanplas LPO" or "Stanplas MPO" of Golden Bear Refining Co.), lithium grease (as sold for example by Lubriko Master Lubricants Co.), petrolatum, purified mineral oil, and white mineral oil. The plasticizing oil or grease is preferably present in the amount of between about 0.2 and 20 parts by weight for 100 parts of the acrylate ester monomer.

To controllably alter the stiffness or shear strength of the finished adhesive, along with the degree of tackiness desired, and the rate of increase in peel strength of an applied carrier film, as well as the rate of polymerization desired in the finished adhesive, I may add to the composition a polyfunctional acrylate ester monomer, which by virtue of its polyfunctionality will act to increase the cross-linking polymerization within the ultimate adhesive. This component should be present in an amount between about 0.1 and 25 parts by weight for each 100 parts by weight of the monofunctional acrylate monomer. The polyfunctional acrylate ester monomer may be any substance falling within that broad category, but preferably is a substance or mixture of substances selected from the group consisting of trimethylolpropanepropoxylate triacrylate, trimethylolpropane triacrylate (e.g. "Chemlink 31" of Ware Chemical Co.), 1,6 hexanediol diacrylate, triethylene glycol diacrylate (e.g. "Chemlink 32" of Ware Chemical Co.), neopentylglycol diacrylate (e.g. "Chemlink 127" of Ware Chemical Co.), pentaerythritolglycol diacrylate, pentaerythritol triacrylate (e.g. "Chemlink 41" of Ware Chemical Co.), tetraethyleneglycol diacrylate (e.g. "Chemlink 25" of Ware Chemical Co.), melamine acrylate, and diethyleneglycol diacrylate.

An anti-oxidant may also be included in the composition, to avoid degradation of the adhesive by oxidation thereof, and in most instances is preferably a substance or mixture of substances selected from the group consisting of tetrabis methylene 3-($3^1$-$5^1$-di-tertbutyl-$4^1$-hydroxyphenyl) proprionate methane (e.g. "Irganox 1010" of Ciba-Geigy Chemical Co.), 1,3,5-trimethyl-2,4,6-tris(3,5-di-tert-butyl-4-hydroxybenzyl)benzene (e.g. "Antioxidant 330" of Ethyl Corp.), and 2(4-hydroxy-3,5-t-butyl anilino) 4,6-bis(n-octylthio) 1,3,5-triazine (e.g. "Irganox 565" of Ciba-Geigy Chemical Co.). The anti-oxidant is preferably present in a proportion of about 0.5 to 1.5 parts by weight for each 100 parts of the elastomer.

If the proportions of the four primary ingredients and tackifying agents selected do not result in the solution viscosity desired for a particular method of application of the adhesive to a particular substrate, a thickening substance may be added in an appropriate amount, such as a silica aero-gel (e.g. "Cab-O-Sil" of Cabot Chemical Co.), asbestos fibers (e.g. "Resin Grade Asbestos" of Union Carbide Corp.), or the like, or a surface active agent such as "Fluorad FC 431" of Minnesota Mining & Manufacturing Co. may be added in minor proportions (typically about 0.12 parts or more by weight per 100 parts of the monofunctional acrylate ester) to improve substrate or carrier wetting.

Because of the number of possible compounding ingredients, the properties of pressure sensitive adhesives prepared according to this invention can be varied to satisfy most foreseeable requirements for tack, peel strength, shear strength and solvent media resistance, on whatever combination of carrier surface and substrate may be encountered. Variations of these properties of a given adhesive composition can also be obtained by varying the processing conditions, that is, by coating and curing either on the intended carrier surface or on the intended protective release sheet if one is to be used, by curing in air or an inert atmosphere, by varying the intensity of the ultraviolet light or other radiation utilized in polymerization, etc.

The adhesive in its uncured state may be coated onto an appropriate substrate in any convenient manner, as by knife coating, spraying, or the like, and is then cured by subjection to radiation of any of the discussed types. Presently preferred are ultraviolet light where minimum cost of equipment is a factor, and electron beam radiation where maximum throughput of product is desired. The radiation may be applied to the adhesive either by moving the radiation source while the product is stationary, or by moving the coated substrate past the radiation source, in either event the movement being at a rate causing the proper amount of total radiation energy to impinge upon each unit area of the product. The quantity of radiation to which the adhesive is subjected, whether it be ultraviolet or electron beam radiation or another type, is such as to attain a full cure of the particular composition employed, typically between about 1 and 10 megrads, and in most cases not over 5 megrads. The substrate may be a flexible tape of Mylar or other material, or be a rigid part or other structure of any type.

The following typical examples are given of certain specific adhesives which have been made in accordance with the invention.

EXAMPLE 1

A composition was formed utilizing the following ingredients in the indicated proportions by weight:

| Material | Parts by Weight |
| --- | --- |
| tetrahydrofurfuryl acrylate (monofunctional acrylate monomer) | 100.00 |
| pentaerythritrol ester of highly stabilized rosin (Foral 85) (tackifying resin) | 107.420 |
| carboxy terminated butadiene-nitrile copolymer (Hycar 1300X9) (elastomer) | 7.511 |
| lineal block styrene-butadiene-styrene copolymer (Kraton 1102) (elastomer) | 25.000 |
| diethoxyacetophenone (photo-initiator) | 5.808 |
| anti-foam agent (BYK-O) | 2.5 |
| trimethylpropane triacrylate (polyfunctional acrylate monomer) | 1.000 |

-continued

| Material | Parts by Weight |
| --- | --- |
| anti-oxidant (Irganox 1010) | .134 |
| paraffinic naphthenic blend plasticizing oil (Stanplas LPO) | 5.000 |

The tetrahydrofurfuryl acrylate was first mixed with the anti-foam agent, following which the other ingredients with the exception of the photo-initiator were mixed in. Finally, the photo-initiator was mixed into the composition. The mixture was applied to a substrate of aluminum which was 0.007 inches thick, and which had been thoroughly cleaned with an appropriate solvent and then dried. The composition was applied to the aluminum as a film having a thickness of 0.002 inches, and after coating was subjected to ultraviolet radiation at a wavelength of approximately 3600 Angstroms, with the coating exposed to air during the ultraviolet radiation step. The film was moved at a rate of 50 feet per minute past and perpendicular to three 200 watt per inch ultraviolet lamps, to excite the photo-initiator, which in turn caused polymerization of the acrylate monomers and elastomers, apparently with cross-linking between the acrylates and elastomers as previously discussed.

The resulting adhesive functioned very effectively as a pressure sensitive adhesive for securing the aluminum substrate to a chrome plated surface, with moderate tack. When tested for adhesion between the solvent cleaned aluminum substrate and chrome plated brass bar stock, the adhesive evidenced an initial 90° peel strength of 6 to 7 pounds per inch, and a rolling ball tack of 1½ inches.

EXAMPLE 2

There was applied to a flexible Mylar film substrate a composition identical with that referred to in Example 1, except for the addition of 2.1 parts by weight of hydroabietyl alcohol for each 100 parts of the overall composition of Example 1. The Mylar was 0.001 inches in thickness, and a coating of 0.001 inches of the adhesive composition was applied thereto. The coated Mylar was advanced at a rate of 50 feet per minute past and perpendicular to three 200 watts per inch ultraviolet lamps, to excite the photo-initiator and polymerize the acrylate monomer and elastomeric components of the composition. The adhesive evidenced a very high tack, and appeared very well adapted for general purpose use. When tested for adhesion between the coated Mylar strip and painted steel, the pressure sensitive adhesive coating showed an initial 90° peel strength of 4 pounds per inch, and a rolling ball tack of ¼ inch.

EXAMPLE 3

A very effective water-white adhesive for a transparent film carrier was produced, utilizing a composition consisting of the following ingredients:

| Material | Parts by Weight |
| --- | --- |
| n-butyl acrylate (monofunctional acrylate monomer) | 100.000 |
| tetrahydrofurfuryl acrylate (monofunctional acrylate monomer) | 25.000 |
| polycyclic hydrocarbon resin (Escorez 5280) (tackifying resin) | 83.334 |
| hydroabietyl alcohol (Abitol) (tackifying resin) | 43.491 |

-continued

| Material | Parts by Weight |
|---|---|
| carboxy terminated butadiene nitrile (Hycar 1300 × 9) (elastomer) | 5.166 |
| linear block styrene-butadiene-styrene copolymer (Kraton 1102) (elastomer) | 41.666 |
| diethoxyacetophenone (photo-initiator) | 7.250 |
| antifoam agent (BYK-O) | .834 |
| anti-oxidant (Irganox 1010) | .209 |
| paraffinic naphthenic blend plasticizing oil (Stanplas LPO) | 5.166 |

This composition was coated to a thickness of 0.001 inches on a cellophane film of 0.001 inches thickness, and was polymerized by movement at a rate of 120 feet per minute past and perpendicular to three 200 watt per inch ultraviolet lamps. There was no visible discoloration of the unpigmented cellophane, and a slight improvement in esthetic appeal. The coating showed an initial 90° peel strength of 4 pounds per inch, and a rolling ball tack of ⅛ inch.

EXAMPLE 4

A flexible corona treated Mylar film substrate ½ mil thick was coated with a composition formed of the following ingredients in the proportions indicated by weight:

| Material | Parts by Weight |
|---|---|
| n-butyl acrylate (monofunctional acrylate monomer) | 39.7 |
| trimethylolpropanetriacrylate (polyfunctional acrylate monomer) | 4.4 |
| lineal block styrene-butadiene-styrene copolymer (Kraton 1102) elastomer | 20.0 |
| anti-oxidant (Irganox 1010) | .1 |
| hydrogenated rosin ester (Foral 85) tackifying resin | 85.3 |
| paraffinic naphthenic blend plasticizing oil (Stanplas LPO) | 4.0 |
| carboxy terminated butadiene-nitrile copolymer (Hycar 1300 × 9) | 5.96 |
| diethoxyactophenone (initiator) | 2.3 |

All ingredients of this composition except the initiator were first mixed together, following which the initiator was blended in. After the composition had been coated onto the Mylar, it was subjected to electron beam radiation by progressive movement of the coated tape past a source of such radiation, with the total dose applied to each point on the coating being 3 megrads. This radiation cured the composition completely. Under test, the coating evidenced a 4 pound per inch 180° peel strength-Mylar to painted steel.

The same composition cured in the same way but with only 2 megrads of electron beam radiation was also completely cured and evidenced as good a peel test as the sample subjected to 3 megrads. A composition which was identical except for deletion of the initiator showed only 2 pounds per inch 180° peel strength and 85% cohesive failure when subjected to 3 megrads of electron beam radiation, and required 6 megrads of such radiation for a complete cure.

ADDITIONAL EXAMPLES

Other examples of adhesives which have been produced in accordance with the invention and cured by ultraviolet light are set forth in the following charts, in which the ingredients are identified by numbers whose significance is set forth in a listing following the charts:

| | Example 5 | Ex. 6 | Ex. 7 | Ex. 8 | Ex. 9 |
|---|---|---|---|---|---|
| Ingredient 1 | 100.00 | | | | |
| Ingredient 2 | | 100.00 | | | |
| Ingredient 3 | | | 100.00 | | |
| Ingredient 4 | | | | 100.00 | 100.00 |
| Ingredient 5 | | 34.79 | | | |
| Ingredient 6 | 60.00 | | | | |
| Ingredient 7 | | | | 143.4 | 300.00 | 100.00 |
| Ingredient 8 | | | | | |
| Ingredient 9 | | 66.7 | | | |
| Ingredient 10 | 50.00 | 33.3 | 33.45 | | |
| Ingredient 11 | | | | | |
| Ingredient 12 | | | | | |
| Ingredient 13 | | | | | |
| Ingredient 14 | | | | | |
| Ingredient 15 | | | | | |
| Ingredient 16 | | 4.1 | 10.0 | 200.0 | 100.0 |
| Ingredient 17 | | | | | |
| Ingredient 18 | | | | | |
| Ingredient 19 | | | | | |
| Ingredient 20 | | | | | |
| Ingredient 21 | | | | | |
| Ingredient 22 | | | | | |
| Ingredient 23 | 5.80 | 5.80 | 4.75 | 5.80 | 2.00 |
| Ingredient 24 | | 4.1 | 6.67 | | |
| Ingredient 25 | | | | | |
| Ingredient 26 | 2.0 | | | | |
| Ingredient 27 | .25 | .167 | .167 | | |

| | Example 10 | Ex. 11 | Ex. 12 | Ex. 13 | Ex. 14 |
|---|---|---|---|---|---|
| Ingredient 1 | 100.00 | | | | |
| Ingredient 2 | | | | 100.00 | |
| Ingredient 3 | | 100.00 | 100.00 | | 100.00 |
| Ingredient 4 | | | | | |
| Ingredient 5 | | | | | |
| Ingredient 6 | | | | | |
| Ingredient 7 | 143.4 | 107.5 | | 106.4 | |
| Ingredient 8 | | | 161.2 | | |
| Ingredient 9 | | | | | |
| Ingredient 10 | 33.37 | 25.00 | 24.94 | 24.7 | |
| Ingredient 11 | | | | | |
| Ingredient 12 | | | | | |
| Ingredient 13 | | | | | |
| Ingredient 14 | | | | | |
| Ingredient 15 | | | | | |
| Ingredient 16 | 10.0 | 7.51 | 7.51 | 7.44 | |
| Ingredient 17 | | | | | |
| Ingredient 18 | | | | | |
| Ingredient 19 | | | | | 25.00 |
| Ingredient 20 | | | | | |
| Ingredient 21 | | | | | |
| Ingredient 22 | | | | | |
| Ingredient 23 | 5.84 | 5.80 | 5.80 | 5.75 | 5.75 |
| Ingredient 24 | 6.67 | 5.00 | 5.00 | 4.95 | |
| Ingredient 25 | 1.00 | 1.00 | 1.00 | 1.00 | 1.00 |
| Ingredient 26 | | | | | |
| Ingredient 27 | .166 | .125 | .125 | .125 | |

| | Example 15 | Ex. 16 | Ex. 17 | Ex. 18 | Ex. 19 |
|---|---|---|---|---|---|
| Ingredient 1 | | | | | |
| Ingredient 2 | | | | | |
| Ingredient 3 | 100.00 | 100.00 | 79.41 | 79.41 | 79.41 |
| Ingredient 4 | | | | | |
| Ingredient 5 | | | | | |
| Ingredient 6 | | | | | |
| Ingredient 7 | 106.4 | 105.0 | 85.30 | 85.30 | 85.30 |
| Ingredient 8 | | | | | |
| Ingredient 9 | | | | | |
| Ingredient 10 | | | | | |
| Ingredient 11 | | | | 19.85 | |
| Ingredient 12 | | | | | 19.85 |
| Ingredient 13 | | 25.0 | | | |
| Ingredient 14 | | | | | |
| Ingredient 15 | | | | | |
| Ingredient 16 | 7.43 | | 5.96 | 5.96 | 5.96 |
| Ingredient 17 | | | | | |
| Ingredient 18 | | | | | |
| Ingredient 19 | | | | | |
| Ingredient 20 | 25.00 | | | | |

| Ingredient | | | | | |
|---|---|---|---|---|---|
| Ingredient 21 | | 19.85 | | | |
| Ingredient 22 | | | | | |
| Ingredient 23 | 5.74 | 5.75 | 4.61 | 4.61 | 4.61 |
| Ingredient 24 | 4.96 | | 3.97 | 3.97 | 3.97 |
| Ingredient 25 | 1.00 | 1.00 | .79 | .79 | .79 |
| Ingredient 26 | | | | | |
| Ingredient 27 | | | | | |

| | Example 20 | Ex. 21 | Ex. 22 | Ex. 23 | Ex. 24 |
|---|---|---|---|---|---|
| Ingredient 1 | | | | | |
| Ingredient 2 | | | | 39.7 | |
| Ingredient 3 | 39.64 | 39.64 | 39.64 | 39.7 | 19.85 |
| Ingredient 4 | | | | | |
| Ingredient 5 | | | | | |
| Ingredient 6 | | | | | |
| Ingredient 7 | 42.65 | 42.65 | 42.65 | 84.45 | 21.33 |
| Ingredient 8 | | | | | |
| Ingredient 9 | | | | | |
| Ingredient 10 | | | | | |
| Ingredient 11 | | | | | |
| Ingredient 12 | | | | | |
| Ingredient 13 | | | | | |
| Ingredient 14 | | 2.5 | | | |
| Ingredient 15 | | | | | 4.97 |
| Ingredient 16 | 2.98 | 2.98 | 2.98 | | 1.49 |
| Ingredient 17 | | | | 25.57 | |
| Ingredient 18 | | | 9.93 | | |
| Ingredient 19 | | | | | |
| Ingredient 20 | | | | | |
| Ingredient 21 | | | | | |
| Ingredient 22 | 2.5 | | | | |
| Ingredient 23 | 2.31 | 2.31 | 2.31 | 4.65 | 1.16 |
| Ingredient 24 | 1.99 | 1.99 | 1.99 | 3.93 | .99 |
| Ingredient 25 | .40 | .40 | .40 | .794 | .20 |
| Ingredient 26 | | | | | |
| Ingredient 27 | | | | | |

In the above charts, the proportions of the various ingredients in each example are given in terms of parts by weight. To simplify the charts the ingredients are identified in the charts by number, with the numbers having the following significance:

Acrylates
Ingredient 1—benzyl acrylate
Ingredient 2—n-butyl acrylate
Ingredient 3—tetrahydrofurfuryl acrylate
Ingredient 4—phenylcellosolve acrylate
Tackifying Resins
Ingredient 5—technical hydroabietyl alcohol
Ingredient 6—glycerol ester of pale wood rosin
Ingredient 7—pentaerythritol ester of highly stabilized rosin
Ingredient 8—vinyl toluene-alpha methyl styrene resin
Ingredient 9—polycyclic hydrocarbon resin
Elastomers
Ingredient 10—linear block styrene-butadiene-styrene
Ingredient 11—radial block styrene-butadiene-styrene
Ingredient 12—linear block styrene butadiene
Ingredient 13—chlorosulfonated polyethylene
Ingredient 14—stereo-specific styrene-butadiene
Ingredient 15—hydroxy terminated liquid polybutadiene
Ingredient 16—carboxy terminated butadiene-nitrile
Ingredient 17—vinyl terminated butadiene-nitrile
Ingredient 18—amine terminated butadiene-nitrile
Ingredient 19—thermoplastic polyurethane
Ingredient 20—polyvinyl butyral
Ingredient 21—vinyl toluene resin
Ingredient 22—polychloroprene
Photo-initiator
Ingredient 23—diethoxyacetophenone
Plasticizing oil
Ingredient 24—aromatic process oil
Polyfunctional acrylates
Ingredient 25—trimethylolpropane triacrylate
Ingredient 26—penterythritolglycol triacrylate
Anti-oxidant
Ingredient 27—tetrabis methylene 3-($3^1$-$5^1$-di-tertbutyl-$4^1$-hydroxyphenyl) proprionate methane While certain specific embodiments of the present invention have been disclosed as typical, the invention is of course not limited to these particular forms, but rather is applicable broadly to all such variations as fall within the scope of the appended claims.

I claim:

1. A composition for forming a pressure sensitive adhesive, comprising by weight:
   about 100 parts monofunctional unsaturated acrylate ester monomer;
   between about 50 and 250 parts essentially saturated thermoplastic tackifying resin polymer dissolved in said acrylate ester monomer;
   between about 4 and 150 parts non-crystallizing elastomeric block copolymer dissolved in said acrylate ester monomer; and
   initiator responsive to radiation to induce copolymerization of the acrylate ester monomer and the non-crystallizing elastomeric block copolymer.

2. A composition as recited in claim 1, in which said acrylate ester monomer is a monomer or mixture of monomers selected from the group consisting of ethyl acrylate, 2-ethylhexyl acrylate, hydroxypropyl acrylate, 2,3 dibromopropyl acrylate, n-propyl acrylate, butyl acrylate, iso-propyl acrylate, n-decyl acrylate, iso-decyl acrylate, nonyl acrylate, iso-nonyl acrylate, benzyl acrylate, tetrahydrofurfuryl acrylate, phenylcellosolve acrylate (phenoxyethyl acrylate), octyl acrylate, iso-octyl acrylate, hydroxyethyl acrylate, ethyleneglycol acrylate phthalate, butoxyethyl acrylate, ethoxyethyl acrylate, cyclohexyl acrylate, lauryl acrylate, and isobornyl acrylate.

3. A composition as recited in claim 1, in which said tackifying resin polymer is a polymer or mixture of polymers selected from the group consisting of esters of rosin, hydrogenated esters of rosin, modified rosin esters, esters of polymerized rosin, esters of hydrogenated rosin, hydrocarbon resin, linear homo polymers of alpha-methyl styrene, alphapinene terpene hydrocarbon resin, aromatic modified C-5 hydrocarbon resin, vinyltoluene alpha methyl styrene co-polymer resins, betapinene terpene resins, polycyclic hydrocarbon resins, and technical hydroabietyl alcohol.

4. A composition as recited in claim 1, in which said initiator is a substance or mixture of substances selected from the group consisting of all phenones and substituted phenones.

5. A composition as recited in claim 1, including polyfunctional acrylate ester monomer intermixed with the other ingredients.

6. A composition as recited in claim 1, including polyfunctional acrylate ester monomer intermixed with the other ingredients, and being a substance or substances selected from the group consisting of trimethylolpropanepropoxylate triacrylate, trimethylolpropane triacrylate, 1,6 hexanediol diacrylate, triethyleneglycol diacrylate, neopentylglycol diacrylate, pentaerythritolglycol diacrylate, pentaerythritol triacrylate, tetraethyleneglycol diacrylate, melamine acrylate, and diethyleneglycol diacrylate.

7. A composition as recited in claim 1, in which said initiator is responsive to ultraviolet light to induce polymerization of the acrylate ester monomer and the non-crystallizing elastomeric material.

8. A composition as recited in claim 1, in which said initiator is responsive to electron beam radiation to induce polymerization of the acrylate ester monomer and the non-crystallizing elastomeric material.

9. A composition as recited in claim 1, including an anti-foaming agent.

10. A composition as recited in claim 1, including an anti-oxidant.

11. A composition as recited in claim 1, including an oil intermixed with the other ingredients.

12. A composition for forming a pressure sensitive adhesive, comprising by weight:
 about 100 parts tetrahydrofurfuryl acrylate monomer;
 between about 50 and 250 parts essentially saturated tackifying resin polymer dissolved in said tetrahydrofurfuryl acrylate monomer;
 between about 4 and 150 parts non-crystallizing elastomeric block copolymer having styrene blocks and dissolved in said tetrahydrofurfuryl acrylate monomer; and
 between about 1 and 6 parts initiator responsive to radiation to induce copolymerization of the tetrahydrofurfuryl acrylate monomer and the non-crystallizing elastomeric block copolymer.

13. The process of forming a pressure sensitive adhesive that comprises:
 providing a composition including, by weight, about 100 parts mono-functional unsaturated acrylate ester monomer, between about 50 and 250 parts essentially saturated thermoplastic tackifying resin polymer dissolved in said acrylate ester monomer, between about 4 and 150 parts non-crystallizing elastomeric block copolymer dissolved in said acrylate ester monomer, and initiator responsive to radiation;
 subjecting said composition to radiation to which said initiator is responsive; and
 inducing copolymerization of said acrylate ester monomer and said non-crystallizing elastomeric block copolymer by said initiator.

14. The process as recited in claim 13, in which said acrylate ester monomer is a substance or substances selected from the group consisting of ethyl acrylate, 2-ethyl hexyl acrylate, hydroxypropyl acrylate, 2,3 dibromopropyl acrylate, n-propyl acrylate, butyl acrylate, iso-propyl acrylate, n-decyl acrylate, iso-decyl acrylate, nonyl acrylate, iso-nonyl acrylate, benzyl acrylate, tetrahydrofurfuryl acrylate, phenylcellosolve acrylate (phenoxyethyl acrylate), octyl acrylate, iso-octyl acrylate, hydroxethyl acrylate, ethyleneglycol acrylate phthalate, butoxyethyl acrylate, ethoxyethyl acrylate, cyclohexyl acrylate, lauryl acrylate, and iso-bornyl acrylate.

15. The process as recited in claim 13, in which said tackifying resin polymer is a substance or substances selected from the group consisting of esters of rosin, hydrogenated esters of rosin, modified rosin esters, esters of polymerized rosin, esters of hydrogenated rosin, hydrocarbon resin, linear homo polymers of alpha-methyl styrene, alpha-pinene terpene hydrocarbon resin, aromatic modified C-5 hydrocarbon resin, vinyl-toluene alpha methyl styrene co-polymer resins, beta-pinene terpene resins, polycyclic hydrocarbon resins and technical hydroabietyl alcohol.

16. The process as recited in claim 13, in which said non-crystallizing elastomeric block copolymer is a substance or substances selected from the group consisting of radial block styrene-butadiene-styrene co-polymer, lineal block styrene-butadiene co-polymer; lineal block styrene-butadiene-styrene co-polymer, styrene-isoprene-styrene lineal block co-polymer, and styrene-ethylene-butylene-styrene lineal block co-polymer.

17. The process as recited in claim 13, in which said initiator is a substance or substances selected from the group consisting of all phenones and substituted phenones.

18. The process as recited in claim 13, in which said radiation is ultraviolet light.

19. The process as recited in claim 13, in which said radiation is electron beam radiation.

20. A pressure sensitive adhesive formed by the method recited in claim 13.

21. A pressure sensitive adhesive formed by the method recited in claim 16.

22. A pressure sensitive adhesive formed by the method recited in claim 14.

23. The process of forming a pressure sensitive adhesive that comprises:
 providing a composition including, by weight, 100 parts tetrahydrofurfuryl acrylate ester monomer, between about 50 and 250 parts essentially saturated tackifying resin polymer dissolved in said tetrahydrofurfuryl acrylate ester monomer, between about 4 and 150 parts non-crystallizing elastomeric block copolymer dissolved in said tetrahydrofurfuryl acrylate ester monomer, and initiator responsive to radiation to emit free radicals;
 subjecting said composition to radiation to which said initiator is responsive; and
 inducing copolymerization of said tetrahydrofurfuryl acrylate ester monomer and said non-crystallizing elastomeric block copolymer by said initiator.

24. A pressure sensitive adhesive made by the process of claim 23.

25. A composition as recited in claim 1, in which said non-crystallizing elastomeric block copolymer is a substance or mixture of substances selected from the group consisting of radial block styrene-butadiene-styrene co-polymer, lineal block styrene-butadiene co-polymer, lineal block styrene-butadiene-styrene co-polymer, styrene-isoprene-styrene lineal block co-polymer, and styrene-ethylene-butylene-styrene lineal block co-polymer.

26. A composition as recited in claim 1, in which said acrylate ester monomer is a substance or substances selected from the group consisting of ethyl acrylate, 2-ethyl hexyl acrylate, hydroxypropyl acrylate, 2,3 dibromopropyl acrylate, n-propyl acrylate, butyl acrylate, iso-propyl acrylate, n-decyl acrylate, iso-decyl acrylate, nonyl acrylate, iso-nonyl acrylate, benzyl acrylate, tetrahydrofurfuryl acrylate, phenylcellosolve acrylate (phenoxyethyl acrylate), octyl acrylate, iso-octyl acrylate, hydroxyethyl acrylate, ethyleneglycol acrylate phthalate, butoxyethyl acrylate, ethoxyethyl acrylate, cyclohexyl acrylate, lauryl acrylate, and iso-bornyl acrylate; said tackifying resin being a substance or substances selected from the group consisting of esters of rosin, hydrogenated esters of rosin, modified rosin esters, esters of polymerized rosin, esters of hydrogenated rosin, hydrocarbon resin, linear homo polymers of alpha-methyl styrene, alphapinene terpene hydrocarbon resin, aromatic modified C-5 hydrocarbon resin, vinyltoluene alpha methyl styrene copolymer resins, beta-pinene terpene resins, polycyclic hydrocarbon resins and technical hydroabietyl alcohol; said non-crystallizing elastomeric block copolymer being a substance or substances selected from the group consisting of radial block styrene-butadiene-styrene copolymer, lineal block styrene-butadiene copolymer, lineal block styrene-butadiene-styrene copolymer, styrene-isoprene-styrene lineal block copolymer and styrene-ethylene-butylene-styrene lineal block copolymer; and said initiator being a substance or substances selected from the group consisting of benzophenone, diethoxyacetophenone, p-bromoacetophenone, and benzoin ether.

27. A composition as recited in claim 26, including polyfunctional acrylate ester monomer intermixed with the other ingredients.

28. A composition as recited in claim 27, including an anti-foaming agent, an oil, and an anti-oxidant intermixed with the other ingredients.

29. A composition for forming a pressure sensitive adhesive, comprising:
monofunctional unsaturated acrylate ester monomer;
essentially saturated thermoplastic tackifying resin polymer dissolved in said acrylate ester monomer;
non-crystallizing elastomeric block copolymer dissolved in said acrylate ester monomer; and
initiator responsive to radiation to induce copolymerization of the acrylate ester monomer and the non-crystallizing elastomeric block copolymer.

30. The process of forming a pressure sensitive adhesive that comprises subjecting the composition of claim 29 to radiation to which said initiator is responsive, and inducing copolymerization of said acrylate ester monomer and said block copolymer by said initiator.

31. A pressure sensitive adhesive formed by the process of claim 30.

32. A composition for forming a pressure sensitive adhesive, comprising:
monofunctional unsaturated acrylate ester monomer;
essentially saturated thermoplastic tackifying resin polymer dissolved in said acrylate ester monomer;
chlorosulfonated polyethylene dissolved in said acrylate ester monomer; and
initiator responsive to radiation to induce copolymerization of the acrylate ester monomer and the chlorosulfonated polyethylene.

33. A composition for forming a pressure sensitive adhesive, comprising:
monofunctional unsaturated acrylate ester monomer;
essentially saturated thermoplastic tackifying resin polymer dissolved in said acrylate ester monomer;
carboxy terminated butadiene-acrylonitrile copolymer dissolved in said acrylate ester monomer; and
initiator responsive to radiation to induce copolymerization of the acrylate ester monomer and the carboxy terminated butadiene-acrylonitrile copolymer.

34. A composition as recited in claim 33, in which said carboxy terminated butadiene-acrylonitrile copolymer has random carboxyl groups on the chain.

35. A composition for forming a pressure sensitive adhesive, comprising:
monofunctional unsaturated acrylate ester monomer;
essentially saturated thermoplastic tackifying resin polymer dissolved in said acrylate ester monomer;
vinyl terminated butadiene-acrylonitrile copolymer dissolved in said acrylate ester monomer; and
initiator responsive to radiation to induce copolymerization of the acrylate ester monomer and the vinyl terminated butadiene-acrylonitrile copolymer.

36. The process of forming a pressure sensitive adhesive that comprises subjecting the composition of claim 32 to radiation to which said initiator is responsive; and inducing copolymerization of said acrylate ester monomer and said chlorosulfonated polyethylene by said initiator.

37. The process of forming a pressure sensitive adhesive that comprises subjecting the composition of claim 33 to radiation to which said initiator is responsive; and inducing copolymerization of said acrylate ester monomer and said carboxy terminated butadiene-acrylonitrile copolymer.

38. The process of forming a pressure sensitive adhesive that comprises subjecting the composition of claim 35 to radiation to which said initiator is responsive; and inducing copolymerization of said acrylate ester monomer and said vinyl terminated butadiene-acrylonitrile copolymer.

39. A pressure sensitive adhesive formed by the process of claim 36.

40. A pressure sensitive adhesive formed by the process of claim 37.

41. A pressure sensitive adhesive formed by the process of claim 38.

* * * * *